Patented Aug. 4, 1931

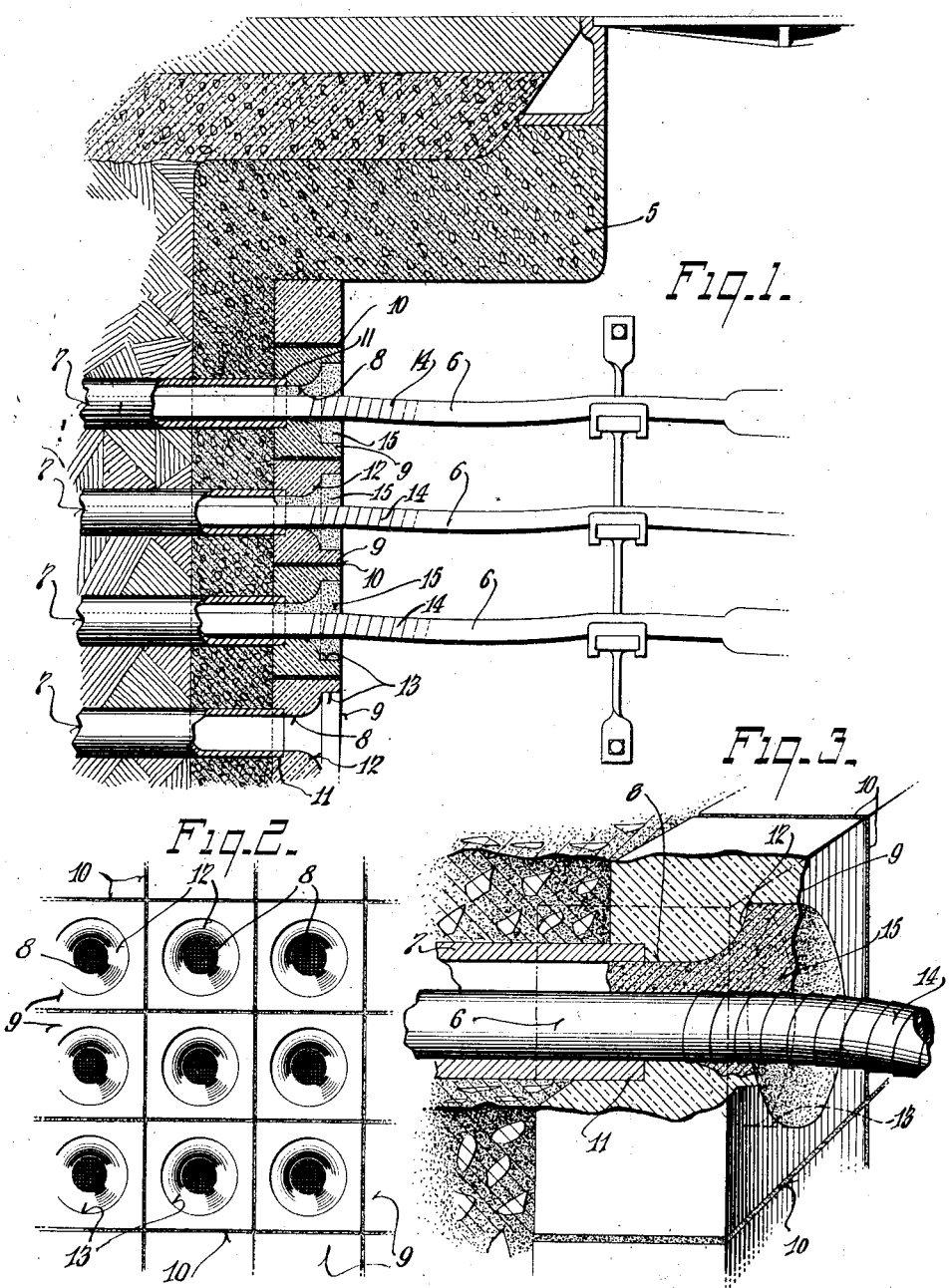

1,817,130

UNITED STATES PATENT OFFICE

ROY L. DODD, OF WAUWATOSA, WISCONSIN, ASSIGNOR, BY MESNE ASSIGNMENTS, TO LINE MATERIAL COMPANY, OF SOUTH MILWAUKEE, WISCONSIN, A CORPORATION OF DELAWARE

DUCT TERMINAL

Application filed January 7, 1929. Serial No. 330,773.

The present day underground cable installations include ducts or conduits of fibre or other suitable material in which the cables are positioned and which terminate at the wall of a manhole or other central point, and where the cables are used for higher voltages it is desirable that their exposed portions or that part which usually extends along the manhole wall be wrapped with a flame-proof material and it is further desirable that the entrances to the conduits or ducts be packed with a flame-proof material. Heretofore, the application of the flame-proof tape to the cables and the packing in the entrances of the ducts or conduits has been an extremely difficult task as the duct or conduit terminals had no provision for facilitating this operation, therefore, this invention has as an object the provision of an improved duct terminal, constructed so as to facilitate the application of the flame proof material to the cable and to the duct entrances.

Another object of this invention resides in the provision of an improved conduit or duct terminal which consists of substantially a square block to permit the stacking thereof one above the other to form a manhole wall.

And a further object of this invention resides in the provision of a terminal block having its aperture through which the cable extends so arranged as to provide an anchor for the adjacent conduit end and to provide a portion which is at all times spaced from the cable to facilitate the winding of the flame-proof material around the cable inwardly of the outer face of the terminal block and the insertion of a suitable flame-proof packing in the conduit entrance to completely surround the cable.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a cross sectional view through a portion of a manhole equipped with my improved conduit terminals, parts being in section and in elevation;

Figure 2 is a front view illustrating a plurality of conduit terminals in position forming one wall of a manhole with the cables removed, and Figure 3 is a fragmentary, perspective view, partly in section and partly in elevation illustrating the cable in position.

Referring now more particularly to the accompanying drawings, in which like numerals designate like parts throughout the several views, the numeral 5 designates generally a manhole or other structure from which one or more underground cables 6 lead through ducts or conduits 7. The conduits communicate with apertures 8 extending centrally through terminal blocks 9 which are substantially square in cross section and are stacked one above the other and adjacent each other being held in position by mortar or other like means 10 and forming one wall of the manhole at which the conduits terminate.

The apertures 8 of the terminal blocks 9 communicate with counterbores 11 in which the ends of the conduits are positioned to be properly aligned with the apertures, the diameter of which is substantially the same as the inside diameter of the conduits. From a point approximately midway between the faces of the terminal blocks the apertures 8 are flared outwardly, as at 12, to terminate in a counter-bore 13 of larger diameter and having its wall at substantially right angles with the outer face of the terminals, the flared portion providing a smooth and rounded edge over which the cables slide when they are positioned within the conduits.

When the cables carry relatively higher voltages it is desirable that they be protected by a flame-proof material from the point where they leave the terminals and to this end the cables 6 are wrapped with a suitable flame-proof tape 14 which is applied thereto from a point spaced inwardly of the outer face of the terminal blocks, the counter-bores 13 being of a diameter sufficient to permit the proper application of the material 14, as will be readily apparent. The counter-bores 13 and the apertures 8 are packed with a suitable flame-proofing material 15 which completely surrounds the cable, engaging the tape 14 and thus completely closes the opening to the interior of the conduits with the flame-proof material, the straight sides of the counter-bores 13 maintaining the packing 15 in position. The taping of the cable inwardly of the man hole wall precludes the possibility of the exposure of an untaped portion of the cable due to the movement thereof by contraction and expansion.

From the foregoing description, taken in connection with the accompanying drawings, it will be readily apparent to those skilled in the art to which an invention of this character appertains that I provide a conduit terminal having means for facilitating the application of flame-proof material to the cable, and for retaining a flame-proof packing within the end of the conduit.

What I claim as my invention is:

1. In a device of the character described, a cable, a conduit in which the cable is positioned, a conduit terminal having a bore of substantially the inside diameter of the conduit, a counter-bore in which the end of the conduit is received, the first bore being flared outwardly to provide a rounded surface to prevent injuring the cable and terminating in a bore of larger diameter, flame-proof material wound about the cable outwardly of the flared bore, and flame-proof material filling the bore of larger diameter around the cable.

2. An underground cable installation including a manhole, conduit terminal blocks forming one wall of the manhole and having apertures through which cables extend the outer portion of the apertures being flared and terminating in counter-bores the wall of which is at all points spaced from its cable, flame-proof material applied to that portion of the cable within the manhole and extending inwardly of the face of the terminal blocks, and flame-proof packing filling the counter-bores around the cables.

In testimony whereof I have hereunto affixed my signature.

ROY L. DODD.